United States Patent
Bent et al.

(10) Patent No.: US 12,379,851 B1
(45) Date of Patent: Aug. 5, 2025

(54) WEAR LEVELING AND GROUPING OF DRIVES BASED ON POSITION IN CHASSIS

(71) Applicant: Seagate Technology LLC, Fremont, CA (US)

(72) Inventors: John Michael Bent, Los Alamos, NM (US); Riyan Alex Mendonsa, Edina, MN (US); Serkay Olmez, Longmont, CO (US); Nicholas James Dance, Boulder, CO (US); Jon D. Trantham, Chanhassen, MN (US); Ian Davies, Longmont, CO (US); Stephen S. Huh, Boulder, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 18/658,636

(22) Filed: May 8, 2024

(51) Int. Cl.
  *G06F 3/06* (2006.01)
(52) U.S. Cl.
  CPC .......... *G06F 3/0614* (2013.01); *G06F 3/0653* (2013.01); *G06F 3/0689* (2013.01)
(58) Field of Classification Search
  CPC ..... G06F 3/0614; G06F 3/0653; G06F 3/0689
  See application file for complete search history.

(56) References Cited

U.S. PATENT DOCUMENTS

| | | | |
|---|---|---|---|
| 8,601,313 B1* | 12/2013 | Horn | G06F 11/3034 |
| | | | 714/6.32 |
| 9,594,633 B2 | 3/2017 | Colgrove et al. | |
| 11,797,386 B2 | 10/2023 | Colgrove et al. | |
| 2010/0217931 A1* | 8/2010 | Beaman | G06F 11/1662 |
| | | | 711/E12.001 |
| 2022/0066663 A1* | 3/2022 | Chen | G06F 3/0616 |

* cited by examiner

*Primary Examiner* — Khoa D Doan
(74) *Attorney, Agent, or Firm* — HOLZER PATEL DRENNAN

(57) ABSTRACT

A processor may determine, for each subdevice of a set of subdevices of a storage enclosure device, one or more reliability measures of the subdevice. A processor may determine, based at least on the one or more reliability measures for the subdevices and a spatial layout rule, a set of striping groups that maximizes a reliability of the set of subdevices of the storage enclosure device, each of the striping groups including a respective subset of the set of subdevices, wherein the spatial layout rule prescribes a geometric layout of the subdevices within striping groups across the storage enclosure device. A processor may store output data of a data striping operation to a particular subset of subdevices associated with a particular striping group of the set of striping groups.

20 Claims, 5 Drawing Sheets

← 410

| Drive 96 | Drive 98 | Drive 100 | Drive 102 | Drive 104 | ICM Fan 5 | ICM Fan 4 | ICM Fan 0 | |
| Drive 97 | Drive 99 | Drive 101 | Drive 103 | Drive 105 | | | ICM Fan 1 | |
| Drive 0 | Drive 12 | Drive 24 | Drive 36 | Drive 48 | Drive 60 | Drive 72 | Drive 84 | Fan Module 3 |
| Drive 1 | Drive 13 | Drive 25 | Drive 37 | Drive 49 | Drive 61 | Drive 73 | Drive 85 | |
| Drive 2 | Drive 14 | Drive 26 | Drive 38 | Drive 50 | Drive 62 | Drive 74 | Drive 86 | |
| Drive 3 | Drive 15 | Drive 27 | Drive 39 | Drive 51 | Drive 63 | Drive 75 | Drive 87 | Fan Module 2 |
| Drive 4 | Drive 16 | Drive 28 | Drive 40 | Drive 52 | Drive 64 | Drive 76 | Drive 88 | |
| Drive 5 | Drive 17 | Drive 29 | Drive 41 | Drive 53 | Drive 65 | Drive 77 | Drive 89 | |
| Drive 6 | Drive 18 | Drive 30 | Drive 42 | Drive 54 | Drive 66 | Drive 78 | Drive 90 | Fan Module 1 |
| Drive 7 | Drive 19 | Drive 31 | Drive 43 | Drive 55 | Drive 67 | Drive 79 | Drive 91 | |
| Drive 8 | Drive 20 | Drive 32 | Drive 44 | Drive 56 | Drive 68 | Drive 80 | Drive 92 | |
| Drive 9 | Drive 21 | Drive 33 | Drive 45 | Drive 57 | Drive 69 | Drive 81 | Drive 93 | Fan Module 0 |
| Drive 10 | Drive 22 | Drive 34 | Drive 46 | Drive 58 | Drive 70 | Drive 82 | Drive 94 | |
| Drive 11 | Drive 23 | Drive 35 | Drive 47 | Drive 59 | Drive 71 | Drive 83 | Drive 95 | |
| Sideplane 0 | Sideplane 1 | Sideplane 2 | Sideplane 3 | Sideplane 4 | Sideplane 5 | Sideplane 6 | Sideplane 7 | |

Enclosure Front

| Drive 96 | Drive 98 | Drive 100 | Drive 102 | Drive 104 | ICM Fan 5 | ICM Fan 4 | ICM Fan 0 | |
| Drive 97 | Drive 99 | Drive 101 | Drive 103 | Drive 105 | | | ICM Fan 1 | |
| Drive 0 | Drive 12 | Drive 24 | Drive 36 | Drive 48 | Drive 60 | Drive 72 | Drive 84 | Fan Module 3 |
| Drive 1 | Drive 13 | Drive 25 | Drive 37 | Drive 49 | Drive 61 | Drive 73 | Drive 85 | |
| Drive 2 | Drive 14 | Drive 26 | Drive 38 | Drive 50 | Drive 62 | Drive 74 | Drive 86 | |
| Drive 3 | Drive 15 | Drive 27 | Drive 39 | Drive 51 | Drive 63 | Drive 75 | Drive 87 | Fan Module 2 |
| Drive 4 | Drive 16 | Drive 28 | Drive 40 | Drive 52 | Drive 64 | Drive 76 | Drive 88 | |
| Drive 5 | Drive 17 | Drive 29 | Drive 41 | Drive 53 | Drive 65 | Drive 77 | Drive 89 | |
| Drive 6 | Drive 18 | Drive 30 | Drive 42 | Drive 54 | Drive 66 | Drive 78 | Drive 90 | Fan Module 1 |
| Drive 7 | Drive 19 | Drive 31 | Drive 43 | Drive 55 | Drive 67 | Drive 79 | Drive 91 | |
| Drive 8 | Drive 20 | Drive 32 | Drive 44 | Drive 56 | Drive 68 | Drive 80 | Drive 92 | |
| Drive 9 | Drive 21 | Drive 33 | Drive 45 | Drive 57 | Drive 69 | Drive 81 | Drive 93 | Fan Module 0 |
| Drive 10 | Drive 22 | Drive 34 | Drive 46 | Drive 58 | Drive 70 | Drive 82 | Drive 94 | |
| Drive 11 | Drive 23 | Drive 35 | Drive 47 | Drive 59 | Drive 71 | Drive 83 | Drive 95 | |
| Sideplane 0 | Sideplane 1 | Sideplane 2 | Sideplane 3 | Sideplane 4 | Sideplane 5 | Sideplane 6 | Sideplane 7 | |

Enclosure Front

FIG. 4B

WEAR LEVELING AND GROUPING OF DRIVES BASED ON POSITION IN CHASSIS

BACKGROUND

In a conventional hard drive storage chassis, hard disk drives (HDDs) are arranged in a grid of rows and columns. Over time, the reliability of HDDs in the chassis decreases as a function of the environmental temperature of the drive, where the reliability of the hottest kept drives is the most degraded. The performance (i.e., throughput, latency, command completion time) of the HDDs decreases as a function of the drive's exposure to acoustic vibration. In some scenarios, chassis fans are used to pull cooling air from the front of the chassis and expel it through the rear of the chassis. Fans are typically located near the rear (the hot side) of the storage chassis. These fans generate acoustic vibration. HDDs located in closer proximity to the fans experience an accelerated decline in reliability and performance of these HDDs compared to HDDs in the same chassis that are less proximate to the fans due to their worse environmental temperature and vibration.

SUMMARY

In some aspects, the techniques described herein relate to a method for storing data, including: determining, for each subdevice of a set of subdevices of a storage enclosure device, one or more reliability measures of the subdevice; determining, based at least on the one or more reliability measures for the subdevices and a spatial layout rule, a set of striping groups that maximizes a reliability of the set of subdevices of the storage enclosure device, each of the striping groups including a respective subset of the set of subdevices, wherein the spatial layout rule prescribes a geometric layout of the subdevices within striping groups across the storage enclosure device; and storing output data of a data striping operation to a particular subset of subdevices associated with a particular striping group of the set of striping groups.

In some aspects, the techniques described herein relate to a system for storing data, including: a storage enclosure device including a set of subdevices; and one or more hardware processors communicatively coupled to the subdevices and configured to perform operations including: determining, for each subdevice of the set of subdevices, one or more reliability measures of the subdevice; determining, based at least on the one or more reliability measures for the subdevices and a spatial layout rule, a set of striping groups that maximizes a reliability of the set of subdevices of the storage enclosure device, each of the striping groups including a respective subset of the set of subdevices, wherein the spatial layout rule prescribes a geometric layout of the subdevices within striping groups across the storage enclosure device; and storing output data of a data striping operation to a particular subset of subdevices associated with a particular striping group of the set of striping groups.

In some aspects, the techniques described herein relate to one or more tangible processor-readable storage media embodied with instructions for executing on one or more processors and circuits of a computing device a process for storing data, the process including: determining, for each subdevice of the set of subdevices, one or more reliability measures of the subdevice; determining, based at least on the one or more reliability measures for the subdevices and a spatial layout rule, a set of striping groups that maximizes a reliability of the set of subdevices of the storage enclosure device, each of the striping groups including a respective subset of the set of subdevices, wherein the spatial layout rule prescribes a geometric layout of the subdevices within striping groups across the storage enclosure device; and storing output data of a data striping operation to a particular subset of subdevices associated with a particular striping group of the set of striping groups.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 4A depicts a set of striping groups of an example storage enclosure device with subdevices of the storage enclosure device assigned to the set of striping groups based on one or more reliability measures of the subdevices and a horizontal spatial layout rule.

FIG. 4B depicts a set of striping groups of an example storage enclosure device with subdevices of the storage enclosure device assigned to the set of striping groups based on one or more reliability measures of the subdevices and a diagonal spatial layout rule.

DETAILED DESCRIPTIONS

Figure 1:
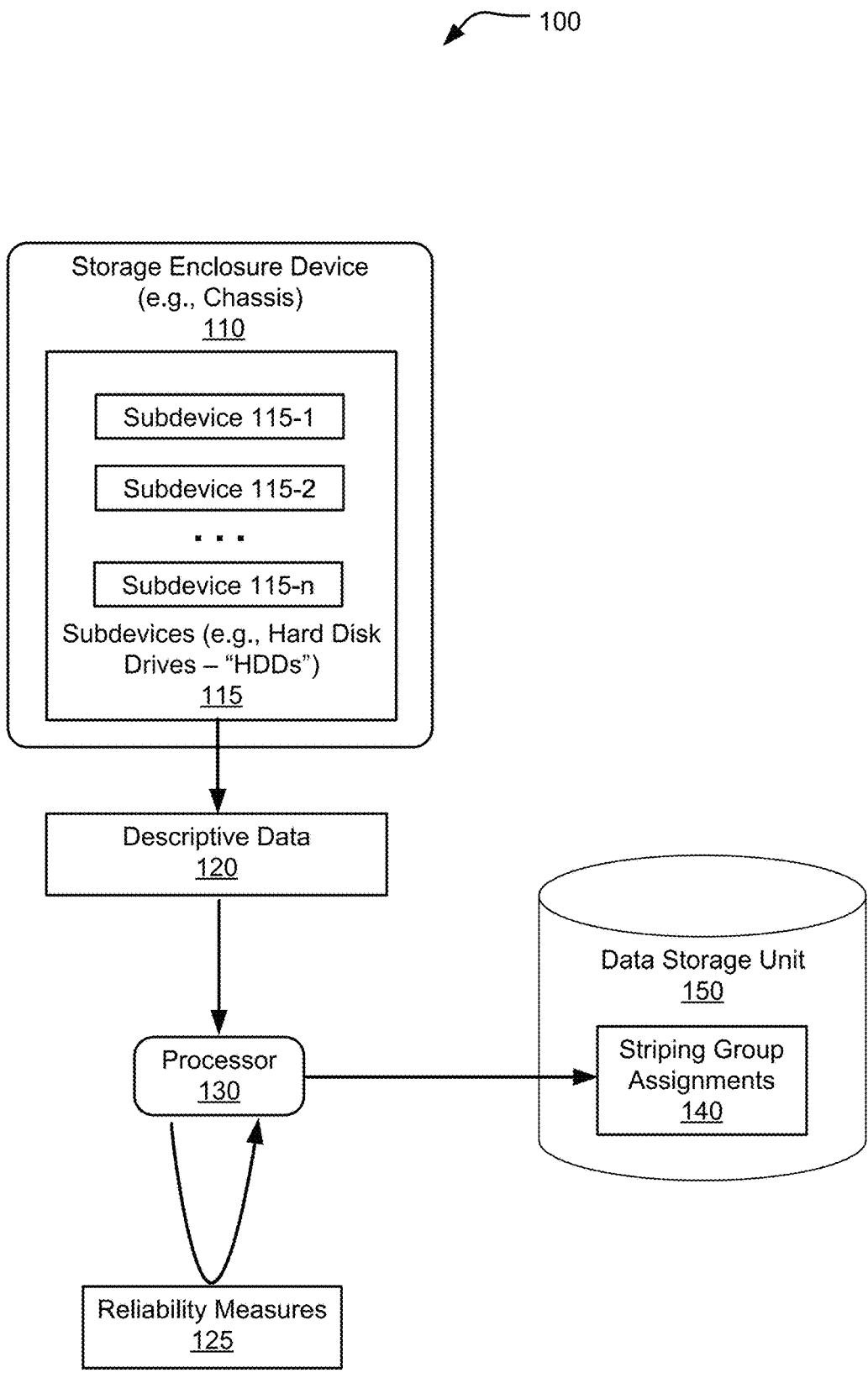
FIG. 1 illustrates an example computing environment for assigning storage subdevices of a storage enclosure device to striping groups based on reliability measures.

Conventional approaches to assigning HDDs of a storage system to striping groups involves grouping the HDDs of a chassis in sequential order row-wise. However, due to the accelerated decline in performance and reliability caused by proximity to chassis fans, conventional approaches to assigning HDDs to striping groups result in a wide variation in performance and reliability of striping groups. Striping groups having a greater proportion of HDDs that are close to the fans will have a faster decline in performance and reliability than striping groups farther from the fan, which results in an overall decline in performance and reliability of the storage system.

The technology disclosed herein addresses these inadequacies of conventional sequential assigning of HDDs to striping groups by providing for the assigning of HDDs to striping groups based at least in part on reliability measures of the HDDs. In the disclosed technology, HDDs are assigned to striping groups that average-out a reliability (e.g., an average failure rate ("AFR")) among the striping groups and, accordingly, improve an overall reliability of the system compared to conventional mapping of striping groups among HDDs of a chassis. The disclosed technology may determine the reliability of HDDs based on one or more positions with respect to the fans, knowledge of the heat flow and acoustic vibration profile within the chassis, or health reporting information received from the HDDs. Accordingly, the technology disclosed herein improves the reliability of the storage system by assigning HDDs to striping groups to maximize a reliability of the specific storage system compared to conventional sequential assigning of HDDs.

In some implementations of the disclosed technology, a processor, such as a storage-enclosure management processor, determines, for each subdevice of a set of subdevices of a storage enclosure device, one or more reliability measures of the subdevice. For example, the processor is a central processing unit ("CPU") or other processor of a computing system that is communicatively coupled to the storage enclosure device. The storage enclosure device may be a storage chassis and the set of subdevices is a set of HDDs within the storage chassis. The storage enclosure device may include the set of subdevices in addition to one or more fans. The set of subdevices and the one or more fans are arranged within the storage enclosure device, for example the fans are arranged on one or more ends of the storage chassis and the subdevices are arranged in rows in the remaining space within the storage enclosure device.

In some instances, the processor determines, based at least on the one or more reliability measures for the subdevices and a spatial layout rule, a set of striping groups that maximizes a reliability of the storage enclosure device, each of the striping groups including a respective subset of the set of subdevices. In some instances, the processor determines a reliability measure based on one or more of a proximity (e.g., a distance) of the subdevice to one or more fans within the storage enclosure device, a location of the subdevice in relation to a vibration profile (e.g., an acoustic vibration profile) of the device, a location of the subdevice in relation to a heat profile of the device, or other factor that may affect a reliability of the subdevice. In some implementations, the processor assigns subdevices to striping groups within the storage enclosure device according to a spatial layout rule so that the striping groups are arranged substantially in accordance with the spatial layout rule to maximize an overall reliability of the storage enclosure device. The spatial layout rule may be a horizontal layout rule, a diagonal layout rule, or other spatial layout rule.

In some instances, the processor stores output data of a striping operation to a particular subset of subdevices associated with a particular striping group of the set of striping groups. The striping operation may be a redundant array of independent disks ("RAID") striping algorithm or another striping algorithm. The striping operation divides input data into a set of data stripes and a data writing operation stores each of these data stripes are stored on a respective subdevice of the particular striping group. In some implementations, a data read operation involves accessing the stored data stripes from their respective subdevices of the particular striping group and providing an output based on the accessed data stripes.

FIG. 1 illustrates an example computing environment 100 for assigning storage subdevices of a storage enclosure device to striping groups based on reliability measures. The example computing environment 100 includes a storage enclosure device 110 that includes subdevices 115 (e.g., n subdevices 115 including subdevice 115-1, subdevice 115-2, . . . subdevice 115-n). In some implementations, the storage enclosure device 110 is a chassis and the subdevices 115 are HDDs. A processor 130 (e.g., a central processing unit) of a computing system receives, accesses, or otherwise determines descriptive data 120 of the subdevices 115. The descriptive data 120 may include, for each subdevice, one or more of a repair bandwidth per subdevice (e.g., MB/s), a base average failure rate ("AFR"), a durability target (e.g., a number of 9's) of the subdevice, a usable capacity of the device (e.g., usable capacity in PB of the chassis), a number of subdevices 115 in the device, a number of striping pools, an error correction per striping pool, a number of spares per striping pool, a proximity of the subdevice to one or more fans of the device, a location of the subdevice in relation to a heat and/or acoustic vibration profile of the device, or other descriptive data 120. In one implementation, the AFR of one of the subdevices 115 may be the AFR under a best condition of that one of the subdevices 115. In some implementations, descriptive data 120 may include data provided by the subdevices 115 and/or data provided by one or more sensors in the device. For example, in some implementations disclosed herein, a subdevice may include one or more sensors that can capture descriptive data 120.

An example acoustic profile or heat flow profile of the storage enclosure device 110 may be based on acoustic vibration and heat data received from one or more sensors located in the storage enclosure device 110. The acoustic vibration profile may, in some implementations, include a map, a graph, or other data structure indicating an intensity of acoustic vibration at various locations within the storage enclosure device 110. The heat flow profile may, in some implementations, include a map, a graph, or other data structure indicating an average operating temperature at various locations within the storage enclosure device 110. The processor 130, in some implementations disclosed herein, may determine the proximity of each of the subdevices 115 to the one or more fans of the device 110 based on a map of the storage enclosure device 110 that indicates a location of each of the subdevices 115 and of the one or more fans. Some of the descriptive data 120 (e.g., a number of striping pools, a number of spares per striping pool) may be configured by an operator of the computing system to which the processor 130 belongs or may be predetermined in accordance with a particular data striping operation used to generate data stripes for storage on the storage enclosure device 110.

In some implementations disclosed herein, the processor 130 determines or more reliability measures 125 based on telemetric descriptive data 120, for example, unit temperature, servo-related metrics (seek times, seek error rates, off-track error rates), read-related error rates (bit error rates, recoverable/unrecoverable error rates), durability metrics, performance metrics, a fail rate, predictive failure rate, or other reliability measure for an individual subdevice or a subset of the subdevices 115. In some implementations, the processor 130 may apply an equation, algorithm, or other process to the descriptive data 120 to determine the reliability measures for the subdevices 115. An example equation may be based on one or more of a repair bandwidth per subdevice, a base AFR under best conditions of the subdevice, a durability target of the subdevice, a usable capacity of the storage enclosure device 110, a number of subdevices 115 in the device, a number of striping pools, an error correction per striping pool, a number of spares per striping pool, a proximity of the subdevice to one or more fans of the device, a location of the subdevice in relation to a heat and/or acoustic vibration profile of the device, or other descriptive data 120. In some implementations disclosed herein, the descriptive data 120 includes one or more reliability measures 125 for the subdevices 115 that are determined by the subdevices 115 themselves or by another processor communicatively coupled to the subdevices 115.

The processor 130 generates striping group assignments 140, assigning subsets of the subdevices 115 into respective striping groups based on the descriptive data 120 and the one or more reliability measures 125 that were determined based on the descriptive data 120. The processor 130 stores the striping group assignments in a data storage unit 150 accessible to the processor 130. In some implementations, the data storage unit 150 is on the storage enclosure device 110. The processor 130 may perform a data striping operation on a set of input data to generate a set of data stripes and store the set of data stripes on a particular set of subdevices 115 associated with a particular striping group based on the striping group assignments 140.

Figure 2:
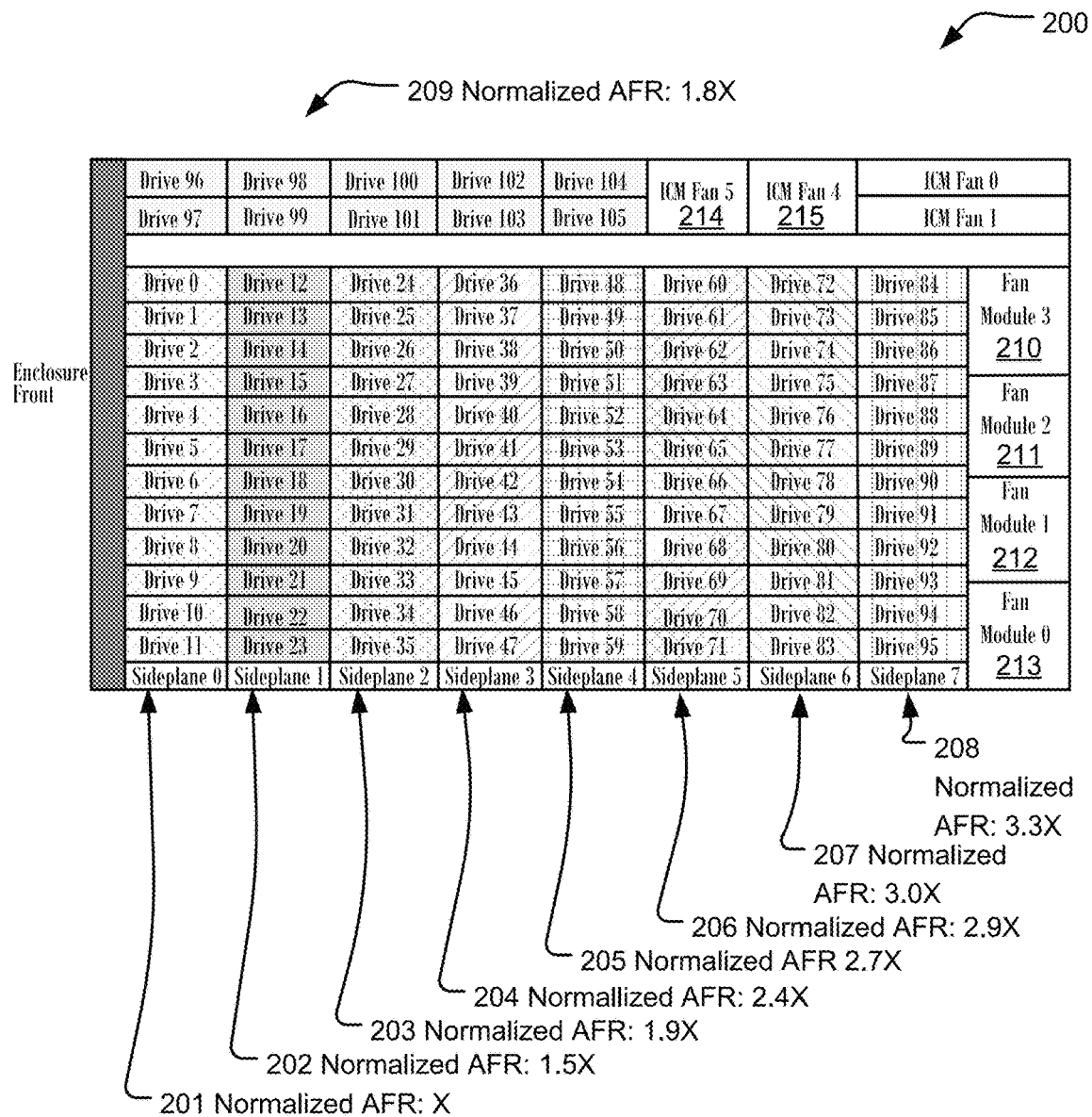
FIG. 2 illustrates reliability measures of subdevices of an example storage enclosure device.

FIG. 2 illustrates reliability measures of subdevices of an example storage enclosure device. The example storage enclosure device 200 includes a set of subdevices (e.g., drives 1-105), various hardware of the storage enclosure device 200 (e.g., input-output module (IOM) 0 and IOM 1, and subplanes 1-7), and fans (e.g., fan module 210, fan module 211, fan module 212, and fan module 213, IOM fan 214, and IOM fan 215). In conventional storage schemes, striping groups are arranged vertically as shown in the example storage enclosure device 200 illustrated in FIG. 2. FIG. 2 depicts a normalized AFR for each column of drives (e.g., column 201, column 202, column 203, column 204, column 205, column 206, column 207, column 208) and the top row 209 of drives is indicated in relation to column 201 of drives (e.g., drives 0-11), which has a normalized AFR represented by X. For example, X represents the average AFR, median AFR, or other descriptive statistic for column 201 that is determined based on the AFRs for each of the drives of column 201. For example, column 202 (drives 12-23) has a normalized AFR of 1.5×, column 203 (drives 24-35) has a normalized AFR of 1.9×, column 204 (drives 36-47) has a normalized AFR of 2.4×, column 205 (drives 48-50) has a normalized AFR of 2.7×, column 206 (60-71) has a normalized AFR of 2.9×, column 207 (drives 72-83) has a normalized AFR of 3.0×, column 208 (drives 84-95) has a normalized AFR of 3.3×, top row 209 (drives 96-105) has a normalized AFR of 1.8×. As illustrated in example storage enclosure device 200, which has the conventional arrangement of striping groups in vertical columns, and as a result of acoustic vibration generated by the fan modules (e.g., fan module 210, fan module 211, fan module 212, and fan module 213), as a distance of the drives from the fan modules of the device 200 increases, the normalized AFR decreases and, as the distance of the drives to the fan modules decreases, the normalized AFR increases.

Figure 3:
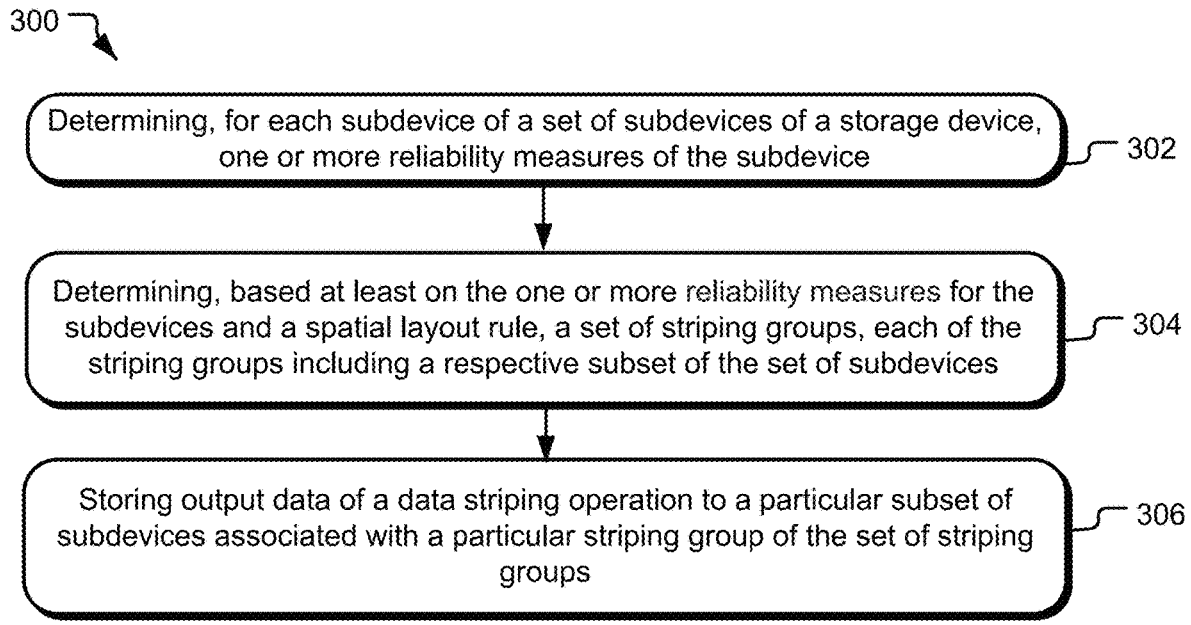
FIG. 3 illustrates an example method for determining a set of striping groups for a set of storage subdevices of a storage enclosure device based on one or more reliability measures of the subdevices and a spatial layout rule and storing output data of a data striping operation on a subset of the set of storage subdevices associated with a particular striping group of the set of striping groups.

FIG. 3 illustrates an example method 300 for determining a set of striping groups for a set of storage subdevices of a storage enclosure device based on one or more reliability measures of the subdevices and a spatial layout rule and storing output data of a data striping operation on a subset of the set of storage subdevices associated with a particular striping group of the set of striping groups. The example method 300 may be performed, in some implementations, by a central processing unit or other processor of a computing system that includes or is otherwise communicatively coupled to the storage enclosure device. In some implementations the subdevices are HDDs, the storage enclosure device is a chassis, and the HDDs are located in the chassis.

Example operation 302 involves determining, for each subdevice of a set of subdevices of a storage enclosure device, one or more reliability measures of the subdevice. The reliability measures, in some implementations disclosed herein, include one or more of an AFR, a durability measure, or other measure of the reliability of the subdevice. For example, a durability is a measure of whether data is lost or corrupted. In some implementations, the operation 302 involves receiving descriptive data from the subdevices of the storage enclosure device and determining the one or more reliability measures based on the descriptive data. In some implementations disclosed herein, the operation 302 involves receiving health reporting by the subdevices. In some implementations disclosed herein, the operation 302 involves determining a relative AFR of each of the subdevices. In some impelementations disclosed herein, a processor determines, based on descriptive data received from the subdevices and/or from one or more sensors of the or of the storage enclosure device, an AFR of each of the subdevices of the storage enclosure device. For example, drive temperature and servo error rate metrics can be retrieved from the via Log Sense commands or via Self-Monitoring-and-Reporting Technology (SMART) commands.

Example operation 304 involves determining, based at least on the one or more reliability measures of the subdevices and a spatial layout rule, a set of striping groups, each of the striping groups including a respective subset of the set of subdevices. In some implementations, the set of striping groups is determined to maximize the reliability of the storage enclosure device as a whole (e.g., to maximize an average reliability of all of the subdevices of the storage enclosure device together). In some instances, the subdevices are evenly divided among striping groups and an equal number of subdevices is assigned to each of the striping groups. In some instances, a substantially equal number of devices is assigned to each of the striping groups. For example, 111 subdevices may be substantially evenly divided among 10 striping groups, resulting in 9 groups of 10 subdevices and 1 striping group with 11 subdevices. In some implementations, the subdevices may be assigned to striping groups with unequal amounts of drives in order to maximize the reliability of the storage enclosure device.

In some instances, the spatial layout rule specifies a spatial or geometric pattern for assigning subdevices among the storage enclosure device to various striping groups. For example, a spatial layout rule specifies a horizontal striping group layout where striping groups geometrically traverse the storage enclosure device substantially in a straight line starting from a first end of the storage enclosure device to a second end of the storage enclosure device. For example, a spatial layout rule specifies a diagonal striping group layout where striping groups geometrically traverse the storage enclosure device substantially in a diagonal line starting from a first end of the storage enclosure device to a second end of the storage enclosure device. In some instances, a layout rule is selected to prevent interaction between the subdevices in the same striping group. For example, a layout rule may ensure a spacing between subdevices in the striping group to minimize interaction between them when data is being written or read from them. FIGS. 4A and 4B describe examples of striping groups that are generated in accordance with horizontal and diagonal spatial layout rules, respectively, in addition to reliability measures. However, other geometrically based layout rules may be used (e.g., squares, crosses, triangles, or L-shaped, or other layout rules) and, in some implementations, layout rules may include following randomization algorithms to randomly assign subdevices to striping groups. Because the operating environment may differ from storage enclosure device to storage enclosure device, the assignment of subdevices to striping groups may vary from storage enclosure device to storage enclosure device even when the storage enclosure devices have the same layout of subdevices.

Example operation 306 involves storing output data of a data striping operation to a particular subset of the subdevices associated with a particular striping group of the set of striping groups. In some instances, the striping operation may be a RAID striping algorithm or other striping algorithm. The striping operation divides input data into a set of data stripes and a data writing operation stores these data stripes among a set of subdevices of the particular striping group. In some implementations disclosed herein, each data stripe is stored on a different subdevice of the particular striping group. In some implementations, wear leveling may be achieved by putting, within striping groups, less data on the subdevices with the worst AFR and keeping the rest as spare or by striping the data in excess that is on the subdevices with the worst AFR. In some implementations, the operation 306 involves dynamic ware leveling based on health reporting by subdevices. For example, if, based on the health reporting data, a subdevice of the particular striping group is experiencing more faults and no environment change, the operation 306 may include reducing the workload on the subdevice and spreading the workload out to other subdevices within the particular striping group. In some implementations, a data read operation may be performed that involves accessing the stored data stripes from their respective subdevices of the particular striping group and reconstructing the original data (e.g., the data as it was prior to the striping operation) based on the accessed data stripes.

FIG. 4A depicts a set of striping groups of an example storage enclosure device 410 with subdevices of the storage enclosure device assigned to the set of striping groups based on one or more reliability measures of the subdevices and a horizontal spatial layout rule. FIG. 4A illustrates, via levels of shading, the geometric arrangement of the assignment of drives of a storage enclosure device 410 to striping groups. The example storage enclosure device 410 includes drives 0-105 arranged into 11 striping groups indicating by different shading schemes. The striping groups are generated both to conform to a horizontal spatial layout rule as well as to maximize a reliability measure for the storage enclosure device 410 as a whole (e.g., to maximize an average reliability for all of the striping groups together). For example, a first striping group includes drive 0, drive 12, drive 24, drive 36, drive 37, drive 38, drive 48, drive 60, drive 72, and drive 84 and a second striping group includes drive 1, drive 13, drive 25, drive 26, drive 49, drive 50, drive 61, drive 62, drive 73, and drive 85, as indicated in FIG. 4A. As shown in FIG. 4A, the striping groups are arranged substantially horizontally from a left side to a right side of the storage enclosure device 410 in accordance with a horizontal layout rule. Substantially horizontal means that a majority or other predefined threshold of the devices in a striping group conform to the horizontal layout. For example, in a third striping group including device 3, device 14 and device 74 are not horizontally aligned with the other devices in the third striping group, but the third striping group as a whole is aligned substantially horizontally across the storage enclosure device 410.

FIG. 4B depicts a set of striping groups of an example storage enclosure device 420 with subdevices of the storage enclosure device assigned to the set of striping groups based on one or more reliability measures of the subdevices and a diagonal spatial layout rule. FIG. 4A illustrates, via levels of shading, the geometric arrangement of the assignment of drives of the storage enclosure device 420 to striping groups. The example storage enclosure device 400 includes drives 0-105 arranged into 11 striping groups indicating by different shading schemes. The striping groups are generated both to conform to a diagonal spatial layout rule as well as to maximize a reliability measure for the storage enclosure device 420 as a whole (e.g., to maximize an average reliability for all of the striping groups together). For example, a first striping group includes drive 2, drive 15, drive 26, drive 41, drive 54, drive 67, drive 60, and drive 93 and a second striping group includes drive 97, drive 12, drive 25, drive 38, drive 51, drive 61, drive 64, drive 77, and drive 90, as indicated in FIG. 4B. As shown in FIG. 4B, the striping groups are arranged substantially diagonally from a left side to a right side of the storage enclosure device 420 in accordance with a diagonal layout rule. Substantially diagonal means that a majority or other predefined threshold of the devices in a striping group conform to a diagonal layout (e.g., a drive is diagonal to another drive if by taking one horizontal move and one vertical move one arrives at the other drive, and so forth, going diagonally in the same horizontal and vertical directions). For example, in the second striping group including drive 97, drive 61 is the only drive that is not diagonally aligned with the other devices in the third striping group, but the second striping group as a whole is aligned substantially diagonally across the storage enclosure device 420.

Figure 5:
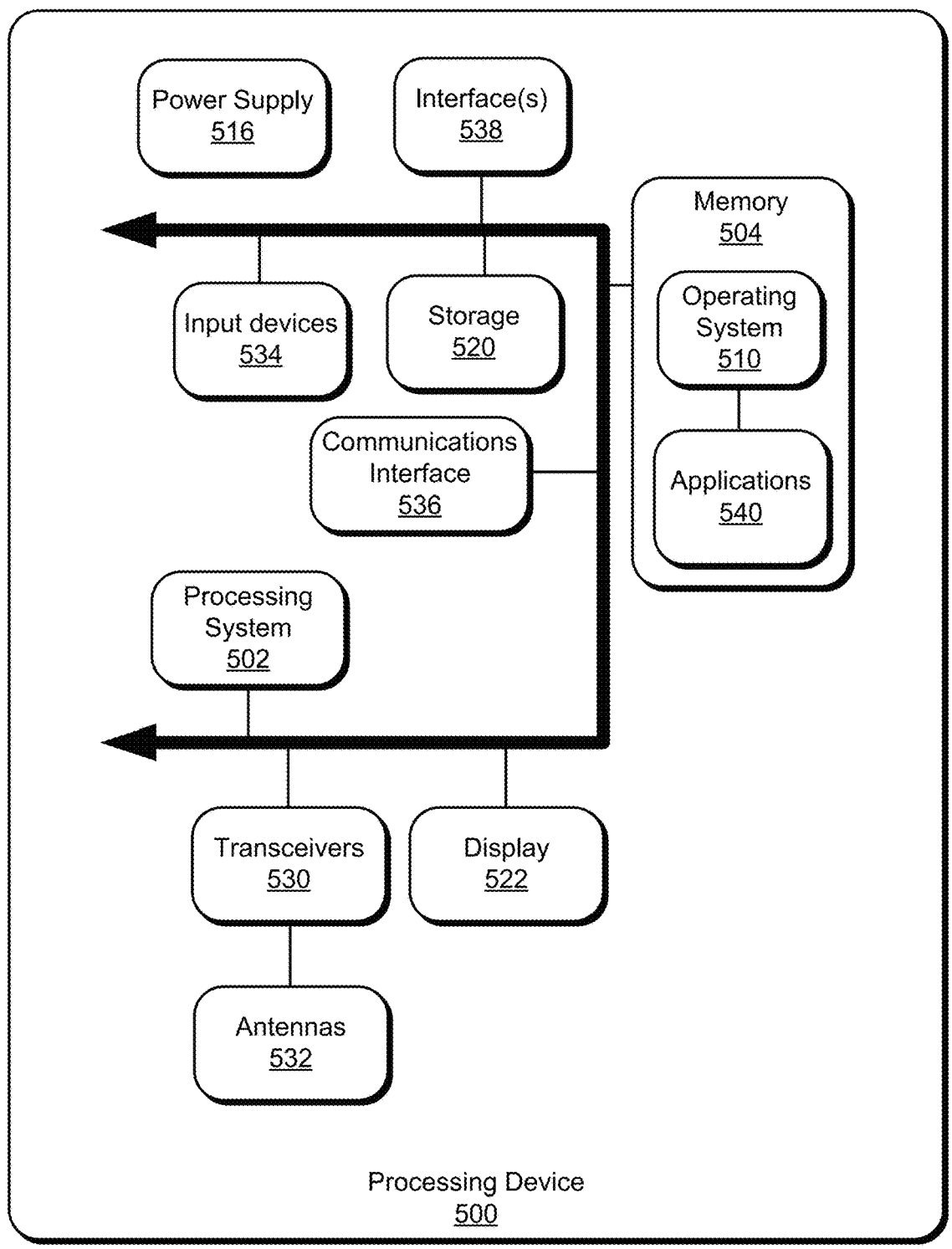
FIG. 5 illustrates an example computing device for use in implementing the described technology.

FIG. 5 illustrates an example computing device 500 for use in implementing the described technology. The computing device 500 may be a client computing device (such as a laptop computer, a desktop computer, or a tablet computer), a server/cloud computing device, an Internet-of-Things (IoT), any other type of computing device, or a combination of these options. The computing device 500 includes one or more hardware processor(s) 502 and a memory 504. The memory 504 generally includes both volatile memory (e.g., RAM) and nonvolatile memory (e.g., flash memory), although one or the other type of memory may be omitted. An operating system 510 resides in the memory 504 and is executed by the processor(s) 502. In some implementations, the computing device 500 includes and/or is communicatively coupled to storage 520. The communication may be done either in-band (i.e., directly through the same interface used for data storage) or out-of-band (e.g., through a side-channel interface).

In the example computing device 500, as shown in FIG. 5, one or more software modules, segments, and/or processors, such as a central processing unit, subdevices of a storage unit, a storage unit, and other program code and modules are loaded into the operating system 510 on the memory 504 and/or the storage 520 and executed by the processor(s) 502. The storage 520 may store an input dataset, a dataset of identified features, embedding spaces, chunks, weights, and other data and be local to the computing device 500 or may be remote and communicatively connected to the computing device 500. In particular, in one implementation, components of a system for assigning subdevices of a storage enclosure device to one or more striping groups may be implemented entirely in hardware or in a combination of hardware circuitry and software.

The computing device 500 includes a power supply 516, which may include or be connected to one or more batteries or other power sources, and which provides power to other components of the computing device 500. The power supply 516 may also be connected to an external power source that overrides or recharges the built-in batteries or other power sources.

The computing device 500 may include one or more communication transceivers 630, which may be connected to one or more antenna(s) 532 to provide network connectivity (e.g., mobile phone network, Wi-Fi®, Bluetooth®) to one or more other servers, client devices, IoT devices, and other computing and communications devices. The computing device 500 may further include a communications interface 536 (such as a network adapter or an I/O port, which are types of communication devices). The computing device 500 may use the adapter and any other types of communication devices for establishing connections over a wide-area network (WAN) or local-area network (LAN). It should be appreciated that the network connections shown are exemplary and that other communications devices and means for establishing a communications link between the computing device 500 and other devices may be used.

The computing device 500 may include one or more input devices 534 such that a user may enter commands and information (e.g., a keyboard, trackpad, or mouse). These and other input devices may be coupled to the server by one or more interfaces 638, such as a serial port interface, parallel port, or universal serial bus (USB). The computing device 600 may further include a display 522, such as a touchscreen display.

The computing device 500 may include a variety of tangible processor-readable storage media and intangible processor-readable communication signals. Tangible processor-readable storage can be embodied by any available media that can be accessed by the computing device 500 and can include both volatile and nonvolatile storage media and removable and non-removable storage media. Tangible processor-readable storage media excludes intangible, transitory communications signals (such as signals per se) and includes volatile and nonvolatile, removable, and non-removable storage media implemented in any method, process, or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method for storing data, comprising: determining, for each subdevice of a set of subdevices of a storage enclosure device, one or more reliability measures of the subdevice; determining, based at least on the one or more reliability measures for the subdevices and a spatial layout rule, a set of striping groups that maximizes a reliability of the set of subdevices of the storage enclosure device, each of the striping groups including a respective subset of the set of subdevices, wherein the spatial layout rule prescribes a geometric layout of the subdevices within striping groups across the storage enclosure device; and storing output data of a data striping operation to a particular subset of subdevices associated with a particular striping group of the set of striping groups.

Clause 2. The method of clause 1, wherein the spatial layout rule comprising at least one of a diagonal layout rule, a horizontal layout rule, a vertical layout rule, or other spatial layout rule.

Clause 3. The method of clause 1, wherein the data striping operation comprises a redundant array of independent disks ("RAID") striping operation, wherein the storage enclosure device comprises a hard disk drive ("HDD") chassis, and wherein the subdevices comprise HDDs.

Clause 4. The method of clause 1, wherein the one or more reliability measures including at least one of an average fail rate ("AFR"), a durability, and a usable capacity.

Clause 5. The method of clause 1, wherein the subdevices are not equally divided among the set of striping groups.

Clause 6. The method of clause 1, wherein the subdevices are substantially equally divided among the set of striping groups.

Clause 7. The method of clause 1, wherein determining the one or more reliability measures of the subdevice further comprises receiving, from one or more of the subdevices, the one or more reliability measures.

Clause 8. The method of clause 1, further comprising determining the one or more reliability measures based at least in part on one or more of a proximity of the subdevice to one or more fan devices of the storage enclosure device, a temperature of the subdevice, or an acoustic vibration of the subdevice.

Clause 9. The method of clause 1, further comprising determining the one or more reliability measures based at least in part on descriptive data including one or more of unit temperature, servo-related metrics, read-related error rates, durability metrics, performance metrics, a fail rate, a predictive failure rate, or other reliability measure.

Clause 10. The method of clause 1, further comprising receiving, from one or more of the subdevices, vibration data comprising a level of acoustic vibration of the subdevice, wherein the one or more reliability measures comprise at least an average fail rate ("AFR").

Clause 11. The method of clause 10, further comprising determining the AFR based at least in part on the received vibration data for the subdevice.

Clause 12. A system for storing data, comprising: a storage enclosure device comprising a set of subdevices; and one or more hardware processors communicatively coupled to the subdevices and configured to perform operations comprising: determining, for each subdevice of the set of subdevices, one or more reliability measures of the subdevice; determining, based at least on the one or more reliability measures for the subdevices and a spatial layout rule, a set of striping groups that maximizes a reliability of the set of subdevices of the storage enclosure device, each of the striping groups including a respective subset of the set of subdevices, wherein the spatial layout rule prescribes a geometric layout of the subdevices within striping groups across the storage enclosure device; and storing output data of a data striping operation to a particular subset of subdevices associated with a particular striping group of the set of striping groups.

Clause 13. The system of clause 12, wherein the spatial layout rule comprising at least one of a diagonal layout rule, a horizontal layout rule, a vertical layout rule, or other spatial layout rule.

Clause 14. The system of clause 12, wherein the data striping operation comprises a redundant array of independent disks ("RAID") striping operation, wherein the storage enclosure device comprises a hard disk drive ("HDD") chassis, and wherein the subdevices comprise HDDs.

Clause 15. The system of clause 12, wherein the one or more reliability measures including at least one of an average fail rate ("AFR"), a durability, and a capacity.

Clause 16. The system of clause 12, wherein the subdevices are not equally divided among the set of striping groups.

Clause 17. The system of clause 12, wherein the subdevices are substantially equally divided among the set of striping groups.

Clause 18. The system of clause 12, wherein determining the one or more reliability measures of the subdevice comprises receiving, from one or more of the subdevices, the one or more reliability measures.

Clause 19. The system of clause 12, the operations further comprising determining the one or more reliability measures based at least in part on one or more of a proximity of the subdevice to one or more fan devices of the storage enclosure device, a temperature of the subdevice, or an acoustic vibration of the subdevice.

Clause 20. One or more tangible processor-readable storage media embodied with instructions for executing on one or more processors and circuits of a computing device a process for storing data, the process comprising: determining, for each subdevice of a set of subdevices of a storage enclosure device, one or more reliability measures of the subdevice; determining, based at least on the one or more reliability measures for the subdevices and a spatial layout rule, a set of striping groups that maximizes a reliability of the set of subdevices of the storage enclosure device, each of the striping groups including a respective subset of the set of subdevices, wherein the spatial layout rule prescribes a geometric layout of the subdevices within striping groups across the storage enclosure device; and Clause 21. storing output data of a data striping operation to a particular subset of subdevices associated with a particular striping group of the set of striping groups. 22. Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method for storing data, comprising:
   determining, for each subdevice of a set of subdevices of a storage enclosure device, one or more reliability measures of the subdevice;
   determining, based at least on the one or more reliability measures for the subdevices and a spatial layout rule, a set of striping groups that maximizes a reliability of the set of subdevices of the storage enclosure device, each of the striping groups including a respective subset of the set of subdevices, wherein the spatial layout rule prescribes a geometric layout of the subdevices within striping groups across the storage enclosure device; and
   storing output data of a data striping operation to a particular subset of subdevices associated with a particular striping group of the set of striping groups.

2. The method of claim 1, wherein the spatial layout rule comprising at least one of a diagonal layout rule, a horizontal layout rule, a vertical layout rule, or other spatial layout rule.

3. The method of claim 1, wherein the data striping operation comprises a redundant array of independent disks ("RAID") striping operation, wherein the storage enclosure device comprises a hard disk drive ("HDD") chassis, and wherein the subdevices comprise HDDs.

4. The method of claim 1, wherein the one or more reliability measures including at least one of an average fail rate ("AFR"), a durability, and a usable capacity.

5. The method of claim 1, wherein the subdevices are not equally divided among the set of striping groups.

6. The method of claim 1, wherein the subdevices are substantially equally divided among the set of striping groups.

7. The method of claim 1, wherein determining the one or more reliability measures of the subdevice further comprises receiving, from one or more of the subdevices, the one or more reliability measures.

8. The method of claim 1, further comprising determining the one or more reliability measures based at least in part on one or more of a proximity of the subdevice to one or more fan devices of the storage enclosure device, a temperature of the subdevice, or an acoustic vibration of the subdevice.

9. The method of claim 1, further comprising determining the one or more reliability measures based at least in part on descriptive data including one or more of unit temperature, servo-related metrics, read-related error rates, durability metrics, performance metrics, a fail rate, a predictive failure rate, or other reliability measure.

10. The method of claim 1, further comprising receiving, from one or more of the subdevices, vibration data comprising a level of acoustic vibration of the subdevice, wherein the one or more reliability measures comprise at least an average fail rate ("AFR").

11. The method of claim 10, further comprising determining the AFR based at least in part on the received vibration data for the subdevice.

12. A system for storing data, comprising:
a storage enclosure device comprising a set of subdevices; and
one or more hardware processors communicatively coupled to the subdevices and configured to perform operations comprising:
determining, for each subdevice of the set of subdevices, one or more reliability measures of the subdevice;
determining, based at least on the one or more reliability measures for the subdevices and a spatial layout rule, a set of striping groups that maximizes a reliability of the set of subdevices of the storage enclosure device, each of the striping groups including a respective subset of the set of subdevices, wherein the spatial layout rule prescribes a geometric layout of the subdevices within striping groups across the storage enclosure device; and
storing output data of a data striping operation to a particular subset of subdevices associated with a particular striping group of the set of striping groups.

13. The system of claim 12, wherein the spatial layout rule comprising at least one of a diagonal layout rule, a horizontal layout rule, a vertical layout rule, or other spatial layout rule.

14. The system of claim 12, wherein the data striping operation comprises a redundant array of independent disks ("RAID") striping operation, wherein the storage enclosure device comprises a hard disk drive ("HDD") chassis, and wherein the subdevices comprise HDDs.

15. The system of claim 12, wherein the one or more reliability measures including at least one of an average fail rate ("AFR"), a durability, and a capacity.

16. The system of claim 12, wherein the subdevices are not equally divided among the set of striping groups.

17. The system of claim 12, wherein the subdevices are substantially equally divided among the set of striping groups.

18. The system of claim 12, wherein determining the one or more reliability measures of the subdevice comprises receiving, from one or more of the subdevices, the one or more reliability measures.

19. The system of claim 12, the operations further comprising determining the one or more reliability measures based at least in part on one or more of a proximity of the subdevice to one or more fan devices of the storage enclosure device, a temperature of the subdevice, or an acoustic vibration of the subdevice.

20. One or more tangible processor-readable storage media embodied with instructions for executing on one or more processors and circuits of a computing device a process for storing data, the process comprising:
determining, for each subdevice of a set of subdevices of a storage enclosure device, one or more reliability measures of the subdevice;
determining, based at least on the one or more reliability measures for the subdevices and a spatial layout rule, a set of striping groups that maximizes a reliability of the set of subdevices of the storage enclosure device, each of the striping groups including a respective subset of the set of subdevices, wherein the spatial layout rule prescribes a geometric layout of the subdevices within striping groups across the storage enclosure device; and
storing output data of a data striping operation to a particular subset of subdevices associated with a particular striping group of the set of striping groups.

* * * * *